(12) United States Patent
Chen

(10) Patent No.: US 6,948,197 B1
(45) Date of Patent: Sep. 27, 2005

(54) CHANGING TABLE FOR PLAYARD

(75) Inventor: Shun-Min Chen, Taipei Hsien (TW)

(73) Assignee: Wonderland Nurserygoods Co., Ltd., (TW)

( * ) Notice: Subject to any disclaimer, the term of this patent is extended or adjusted under 35 U.S.C. 154(b) by 0 days.

(21) Appl. No.: 10/957,757

(22) Filed: Oct. 4, 2004

(30) Foreign Application Priority Data

May 21, 2004 (CN) .......................... 200420042491

(51) Int. Cl.$^7$ .......................... A47D 7/00; A47D 13/06; F16C 11/00
(52) U.S. Cl. .......................... 5/93.1; 5/655; 403/97
(58) Field of Search .......................... 5/93.1, 93.2, 97, 5/98.1, 99.1, 655, 503.1, 504.1, 507.1, 658; 403/91–98

(56) References Cited

U.S. PATENT DOCUMENTS

| | | | | |
|---|---|---|---|---|
| 4,929,113 A | * | 5/1990 | Sheu | 403/157 |
| 5,039,118 A | * | 8/1991 | Huang | 280/47.371 |
| 5,056,805 A | * | 10/1991 | Wang | 280/47.36 |
| 5,062,179 A | * | 11/1991 | Huang | 16/436 |
| 5,123,768 A | * | 6/1992 | Franklin | 403/96 |
| 5,168,601 A | * | 12/1992 | Liu | 16/445 |
| 5,377,368 A | * | 1/1995 | Cheng | 5/99.1 |
| 5,381,570 A | * | 1/1995 | Cheng | 5/99.1 |
| 5,542,151 A | * | 8/1996 | Stranski et al. | 16/326 |
| 5,617,592 A | * | 4/1997 | Cheng | 5/99.1 |
| 5,765,958 A | * | 6/1998 | Lan | 403/97 |
| 5,791,804 A | * | 8/1998 | Cheng | 403/97 |
| 5,918,329 A | | 7/1999 | Huang | 5/93.1 |
| 6,173,462 B1 | | 1/2001 | Huang et al. | 5/655 |
| 6,233,759 B1 | | 5/2001 | Warner, Jr. et al. | 5/99.1 |
| 6,322,098 B1 | * | 11/2001 | Lan | 280/642 |
| 6,503,018 B2 | * | 1/2003 | Hou et al. | 403/97 |
| 6,543,070 B2 | | 4/2003 | Longenecker et al. | 5/93.1 |
| 6,565,111 B2 | * | 5/2003 | Ageneau | 280/647 |
| 6,626,452 B2 | * | 9/2003 | Yang et al. | 280/643 |
| 6,629,801 B2 | * | 10/2003 | Cheng | 403/101 |
| 6,692,178 B2 | * | 2/2004 | Yu | 403/85 |
| 2002/0166169 A1 | * | 11/2002 | Longenecker et al. | 5/93.1 |

* cited by examiner

*Primary Examiner*—Robert G. Santos
(74) *Attorney, Agent, or Firm*—Scully, Scott, Murphy & Presser

(57) ABSTRACT

A changing table for a playard includes a front and rear rails, and a pair of side rails connected to each other to form a platform substantially rectangular or elliptical in shape. A first pivot joint with a button mounted at the exterior is provided at one end of one of the pair of side rails. One end of the rear rail is attached to a second pivot joint which corresponds to the first pivot joint in structure. The first and second pivot joints may be coupled to each other to define a space therein to receive a toothed disc and a compression spring. By means of the cooperation between the pivot joints, toothed disc and compression spring, the first pivot joint moved by the side rail is rotatable within a predetermined angular range and may be locked at a predetermined angle. By such arrangement, the user can readily actuate the button of the first pivot joint to swing the side rail attached to the first pivot joint, to thereby conveniently fold and/or unfold the changing table.

11 Claims, 8 Drawing Sheets

CHANGING TABLE FOR PLAYARD

FIELD OF THE INVENTION

The present invention relates generally to a changing table for a playard which is simple and easy to operate, and may preclude accidental collapse of the changing table which is frequently happened in the playard of the known type.

BACKGROUND OF THE INVENTION

Changing tables for playards are well known in the prior art. A parent or caretaker can change a child's diaper or perform other baby caretaking tasks on a changing table that can be mounted to the top of the playard. The changing table, which is generally rectangular in shape, can be supported on three sides by three upper frame supports of the playard. After the child's diaper has been changed, the changing table can be removed from the playard, or in some applications, can be swung about an upper frame support of the playard to a storage position exterior of the playard. In this respect, the parent or caretaker can lift the side of the changing table opposite the upper frame support and can swing the table about the upper frame support to its storage position at an exterior side of the playard. The changing table can then rest in its storage position exterior of the playard.

An exemplary apparatus in the prior art is described in U.S. Pat. No. 6,543,070 incorporated herein by reference. As seen in FIG. 8, in conventional changing tables 10, the folding arms 14, 16 are designed to pivot about pivot joints 12, and thus the changing table can be rotated around the pivot joints 12 to its storage position. However, these changing tables 10 have a disadvantage in that, when the baby is placed on the changing table, a rolling movement of the baby may accidentally move the folding arms 14, 16 to pivot about the pivot joint 12, renders the folding arms 14, 16 to collapse and harm the baby.

SUMMARY OF THE INVENTION

The main objective of the present invention is to provide a changing table for a playard which tends to obviate the aforementioned problem. The changing table according to the present invention includes only a pivot joint at one side, and the user can readily actuate a button of the pivot joint to conveniently fold and/or unfold the changing table. Therefore, it is simple and easy to operate the changing table.

The present invention relates to a changing table for a playard which includes a front and rear rails, and a pair of side rails connected to each other to form a platform substantially rectangular or elliptical in shape. A first pivot joint with a button mounted at the exterior is provided at one end of one of the pair of side rails. One end of the rear rail is attached to a second pivot joint which corresponds to the first pivot joint in structure. The first and second pivot joints may be coupled to each other to define a space therein to receive a toothed disc and a compression spring. By means of the cooperation between the pivot joints, toothed disc and compression spring, the first pivot joint moved by the side rail is rotatable within a predetermined angular range and may be locked at a predetermined angle. By such arrangement, the user can readily actuate the button of the first pivot joint to swing the side rail attached to the first pivot joint. In this way, the changing table can be swung about the rear rail and move between an operation position and a storage position. In the operation position, the first pivot joint is securely locked to preclude accidental collapse of the changing table. Therefore, the present invention provides the advantage in that the user needs only one hand to conveniently fold and/or unfold the changing table with the other hand holding the baby.

Additional features and advantages of the present invention will be set forth in the description to follow. The objectives and other advantages of the invention will be realized and attained by the structure particularly pointed out in the written description and claims as well as the appended drawings.

BRIEF DESCRIPTION OF THE DRAWINGS

The present invention will now be described with reference to the accompanying drawings illustrating preferred embodiments, in which.

DETAILED DESCRIPTION OF THE PREFERRED EMBODIMENTS

Figure 1:
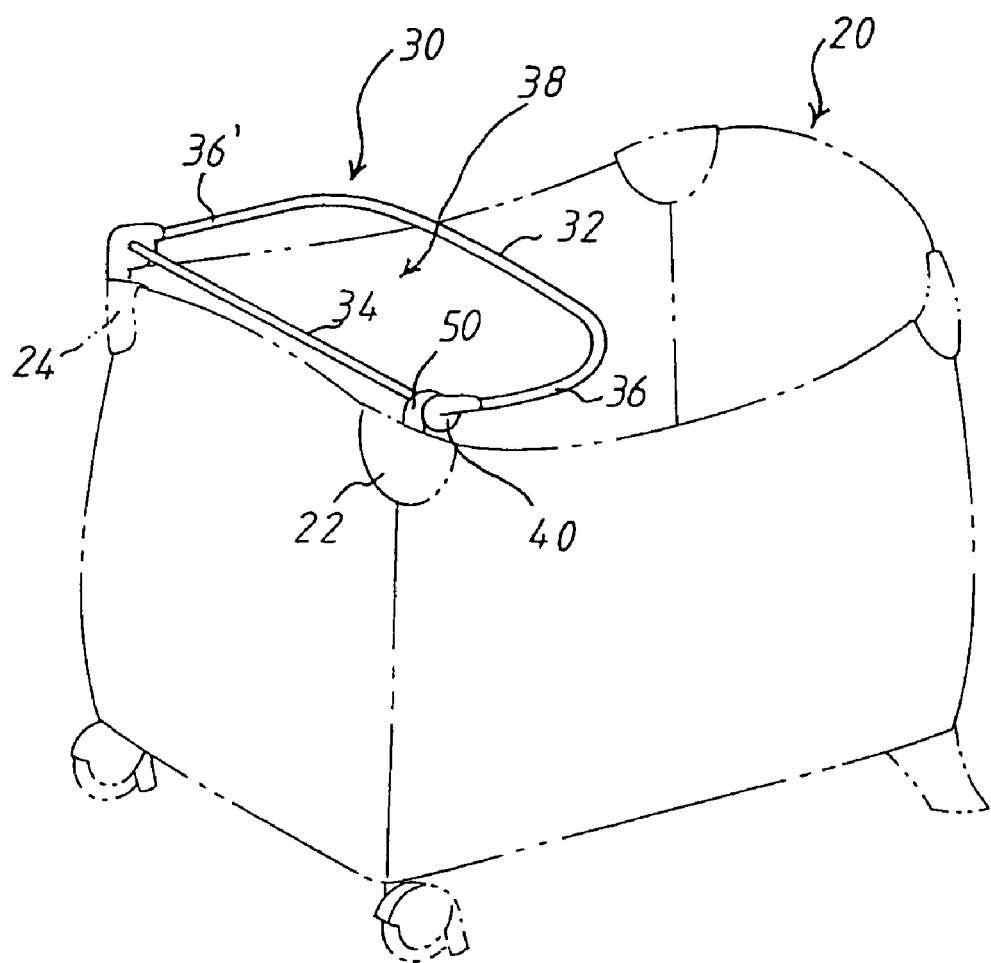
FIG. 1 is a schematic view of a playard with a changing table in accordance with the present invention, in which the changing table frame is in an open position.

Referring to the figures, wherein like numerals indicate like parts, and in particular to FIG. 1, a playard 20 is shown with a changing table 30 mounted thereto in accordance with the present invention. The playard 20 can be any conventional playard having at least one upper end rail member and a pair of upper side rail members (not shown). In general, the upper side rail members are connected to the end rail member and other structural members, such as legs, corner pieces 22, 24, etc.

Corner pieces 22, 24 are provided with recesses (not shown) through which bar-like components of the changing table 30 can be inserted for mounting to the playard 20.

Figure 2:
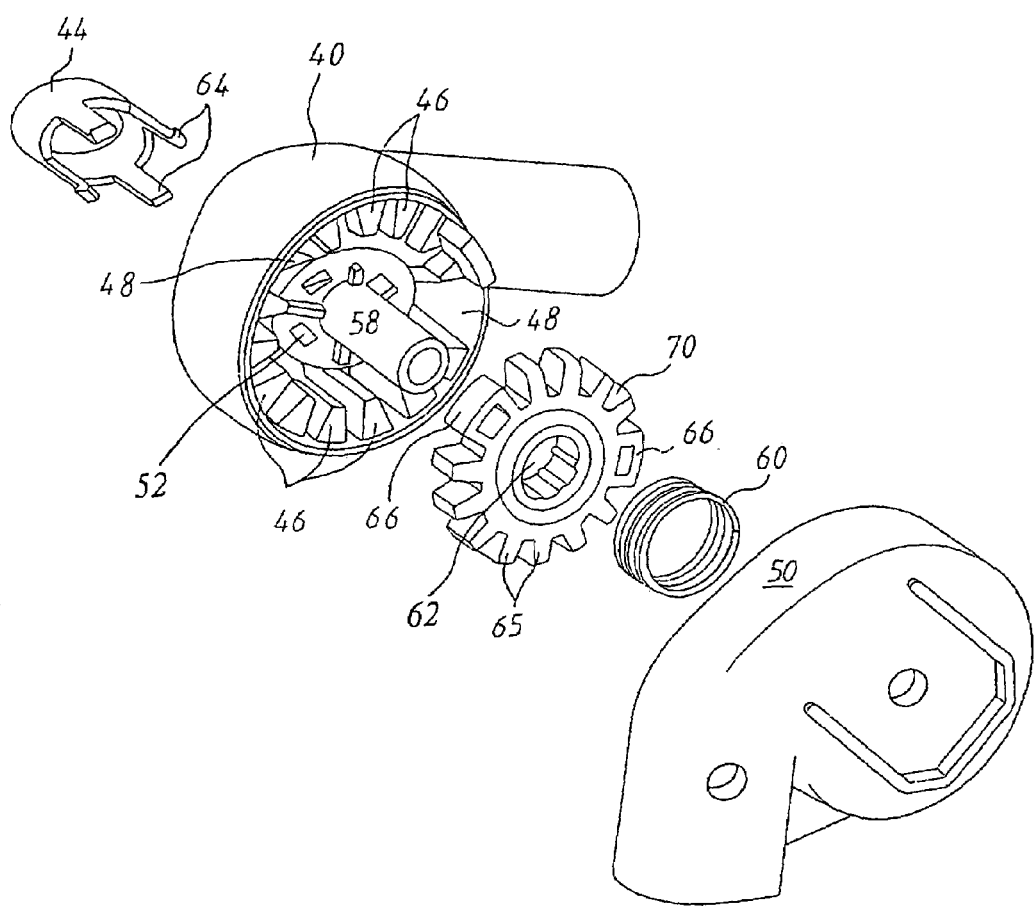
FIG. 2 is an exploded view of an essential component of the changing table in accordance with one preferred embodiment of the present invention.
Figure 3:
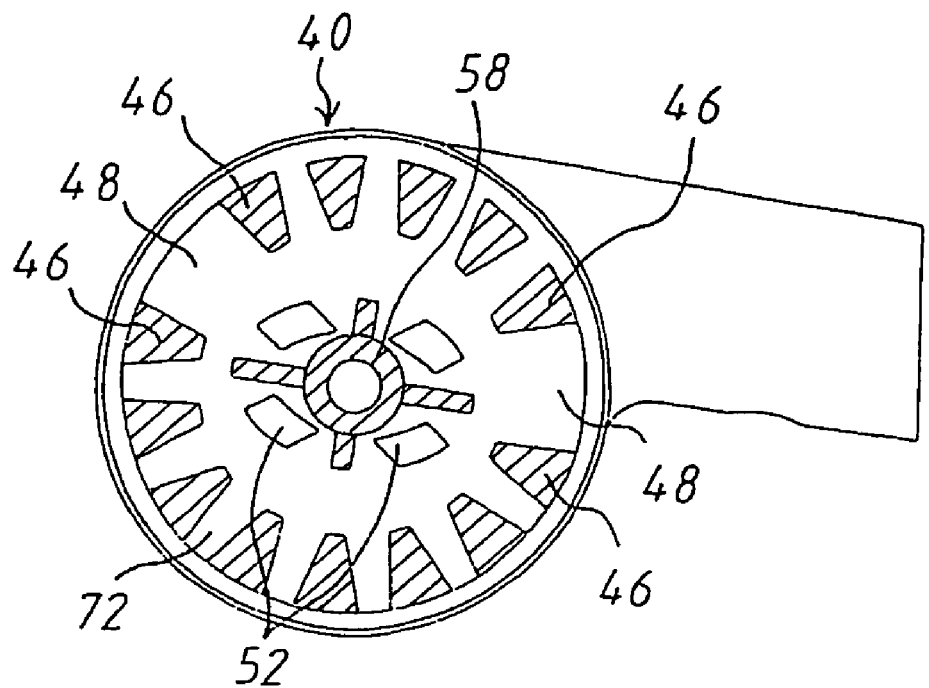
FIG. 3 is a sectional view of a first pivot joint.
Figure 4:
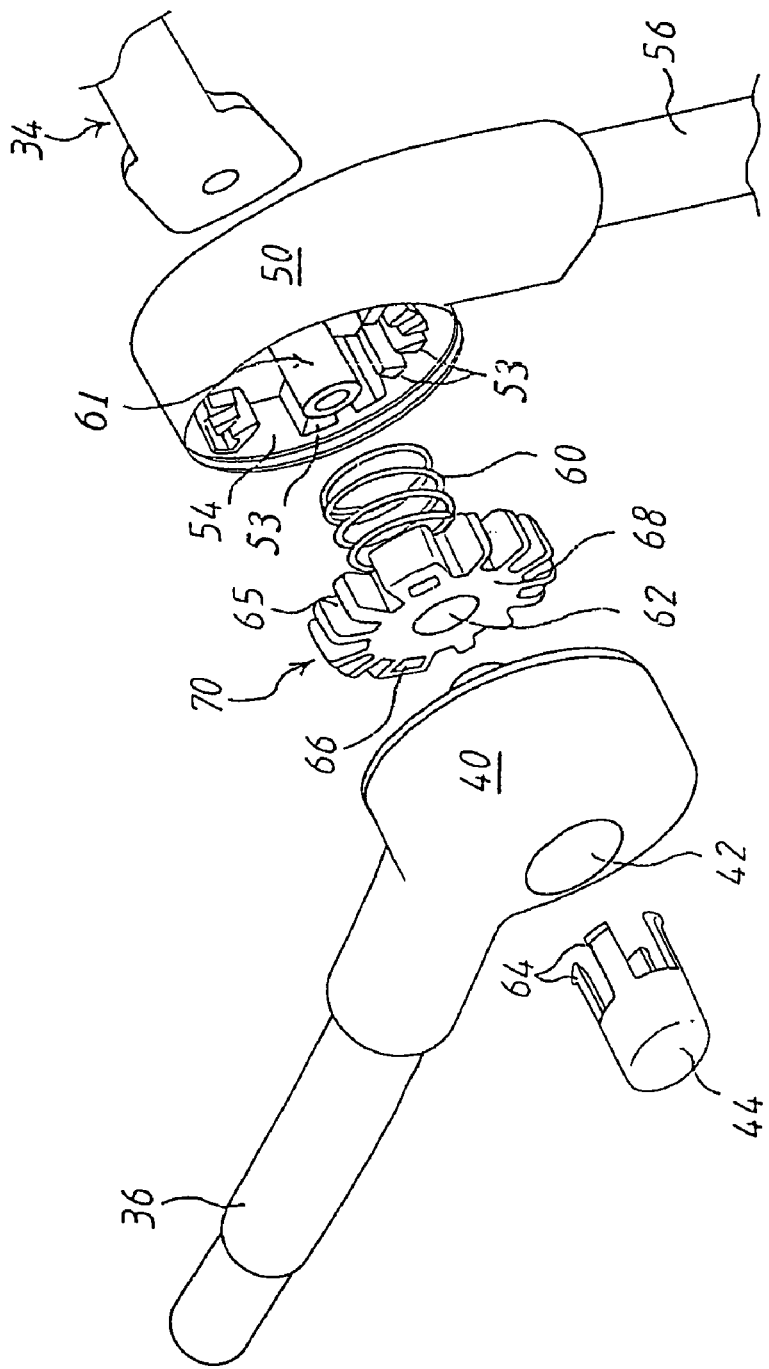
FIG. 4 is similar to FIG. 2, but viewed from another direction.

Changing table 30 includes front and rear rails 32, 34 and a pair of side rails 36, 36' to form a platform 38 substantially rectangular or elliptical in shape. The front and rear rails 32, 34, and side rails 36, 36' may be separate components, or formed integrally to a single rail assembly. Referring to FIGS. 1, 2 and 4, a first pivot joint 40 is provided at one end of the side rail 36. The first pivot joint 40 is a hollow, cylindrical body closed at one end. The first pivot joint 40 has an opening 42 provided at an outer wall thereof at a substantially center position, through which a button 44 may be inserted. The cylindrical first pivot joint 40 has a cavity wall at a location about half a distance of the cylindrical body lengthwise. The cavity wall has four apertures 52 through which the legs 64 of the button 44 pass. In this respect, the structural features of the cavity wall are best shown in FIG. 3 which illustrates a sectional view of the first pivot joint 40.

A conventional pivot joint (not shown) is provided at one end of the side rail 36' to cooperate with the first pivot joint 40, so that the changing table 30 is pivotal.

The first pivot joint 40 has a plurality of ribs 46 spaced apart from each other and formed along the full, inner periphery of the cylindrical body. Each of the ribs 46 is substantially triangular in cross-section. The ribs 46 are substantially regularly spaced apart from each other, but in two appropriate positions, a rib is omitted so that a wider space is formed in between two adjacent ribs. The wider space defines a substantially rectangular groove 48.

Referring to FIGS. 1 and 4, the rear rail 34 has a second pivot joint 50 attached thereto at the end connected to the side rail 36. The second pivot joint 50 is a hollow, cylindrical body closed at one end. Similarly, the second pivot joint 50 has a plurality of ribs 53 spaced apart from each other and formed along the full, inner periphery of the cylindrical body. Each of the ribs 53 is substantially triangular in cross-section. The ribs 53 are also substantially regularly spaced apart from each other, and with a rib each omitted in two appropriate positions, so that a wider space that defines a substantially rectangular groove 54 is formed in between two adjacent ribs. In other words, the second pivot joint 50 corresponds to the first pivot joint 40 in structure, and thus the first and second pivot joints 40, 50 can be coupled to each other.

The lower end of the second pivot joint 50 has a bar 56 adapted to be removably inserted into the recess of the corner piece 22 of the playard 20. Therefore, the changing table 30 can be mounted onto the playard 20 by inserting the bar 56 into the recess of the corner piece 22.

A cylindrical piece or post 58 protrudes from the center of the cavity wall of the first pivot joint 40. A cylindrical piece or post 61 protrudes from the center of the second pivot joint 50. The functions of the posts 58, 61 will be described hereinafter.

In assembling the changing table 30, before the first and second pivot joints 40, 50 are coupled to each other, a compression spring 60 is placed to wind the post 61 of the second pivot joint 50. A toothed disc 70 is then placed to urge against the compression spring 60 by allowing the post 61 to pass through a center opening 62 thereof. By such arrangement, the compression spring 60 and toothed disc 70 are positioned between the first and second pivot joints 40, 50.

Figure 5:
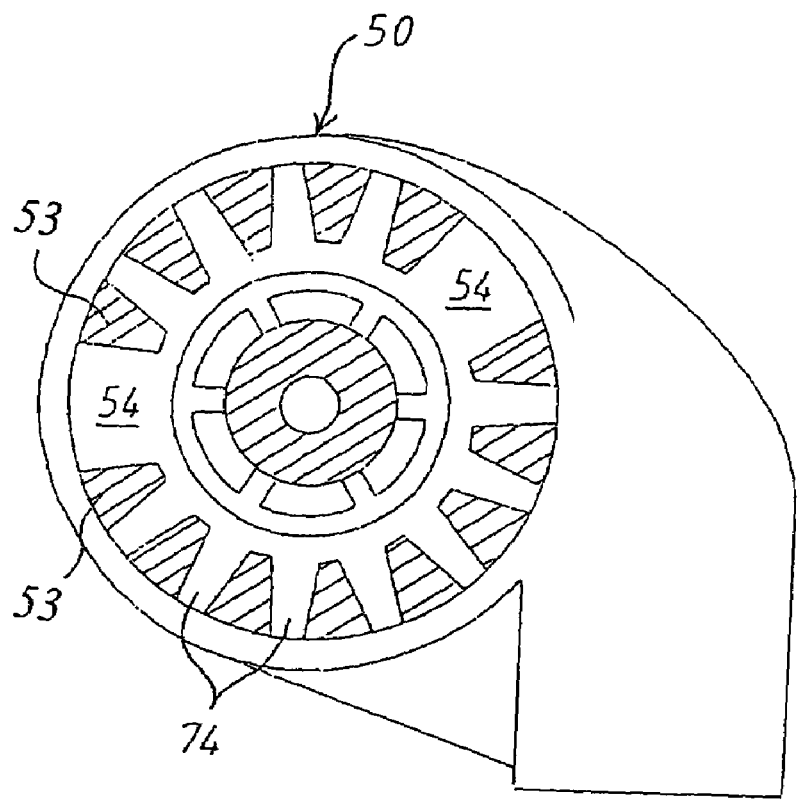
FIG. 5 is a sectional view of a second pivot joint.

The toothed disc 70 includes a plurality of radially extending teeth 65, each of which is substantially triangular in cross-section. The teeth 65 are spaced apart from each other, and at two appropriate positions the teeth are replaced with gear-like blocks 66 which are substantially rectangular in shape. In particular, the teeth of the disc 70 are configured to cooperate with the ribs of the first and second pivot joints 40, 50. In assembling, the disc 70 is accommodated in a space defined by the first and second pivot joints 40, 50 upon the coupling of the pivot joints 40, 50. As the disc 70 is located in the space, the teeth 65 of the disc 70 are accommodated in the grooves 72, 74 formed by adjacent ribs 46, 53 of the first and second pivot joints 40, 50, respectively, and the pair of gar-like blocks 66 are accommodated in the wider grooves 48, 54. The detailed structure of the second pivot joint 50 is best shown in FIG. 5 that illustrates the sectional view thereof.

Referring to FIGS. 2 and 3, the button 44 is a cap-like body, and preferably has four legs 64 with hooks extending outwardly from the lower edge of the button 44. The legs 64 of the button 44 are adapted to pass through the apertures 52 of the cavity wall of the first pivot joint 40 to urge against one surface 68 of the disc 70 (see FIG. 4). The button 44 is precluded from falling off the first pivot joint 40 by the locking effect provided by the hooks of the legs 64.

In use, the changing table 30 is mounted onto the playard 20 by inserting the bars 56 (only one of which is shown in the drawings) extending from the second pivot joint 50 and a conventional pivot joint into the recesses of the corner pieces 22, 24.

Figure 6:
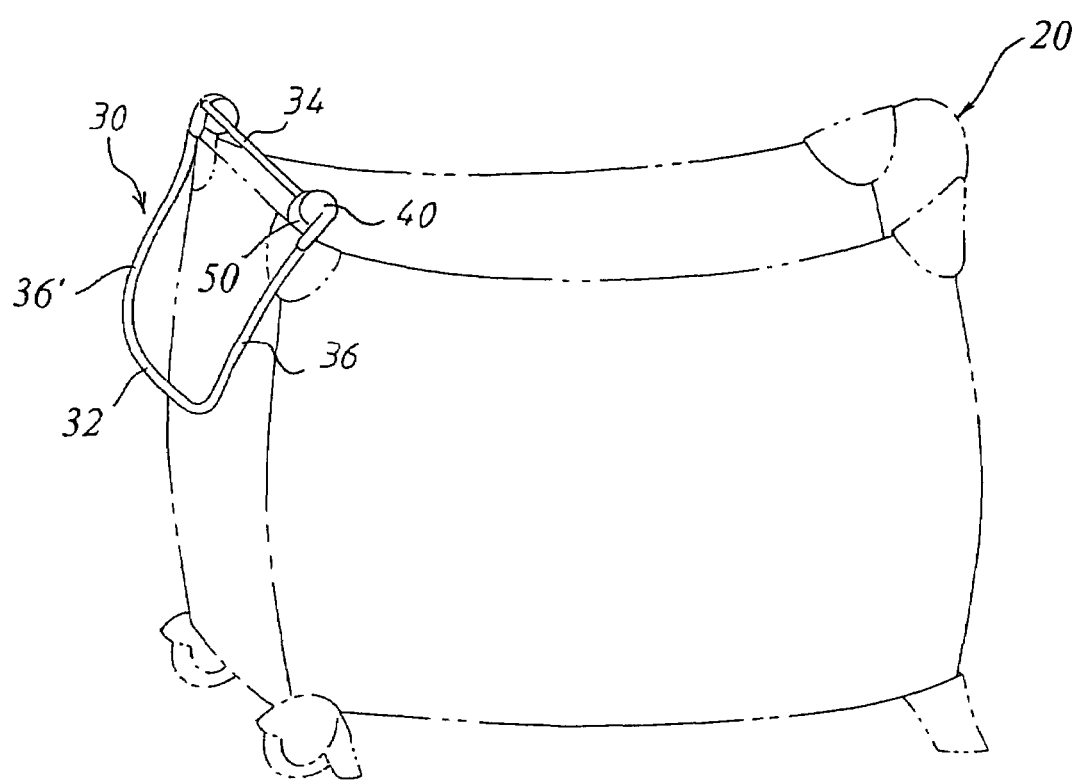
FIG. 6 is schematic view showing the changing table in a storage position exterior of the playard.

With reference to FIG. 6, when the changing table 30 is not in use, it can be swung about the pivot joint assembly (which is a combination of the first and second pivot joints 40, 50 and a pivot joint of the known type as mentioned hereinbefore) to its storage position at an exterior side of the playard 20. The changing table 30 can then rest in its storage position exterior of the playard 20.

When it is desired to use the changing table 30, the user can lift either one of the side rails 30 or 36 of the changing table 30 to swing the changing table to an open position (in-use position). As the changing table 30 is moved to the open position, the side rail 36 moves the first pivot joint 40 to reach a predetermined orientation, in which the grooves 48 of the first pivot joint 40 is in alignment with the blocks 66 of the disc 70. At this instant, due to the restoring force of the compression spring 60, the disc 70 can be accommodated and locked in the first pivot joint 40 with the teeth 65 and blocks 66 received in the grooves 72, 48, respectively. Therefore, the changing table can be securely fixed in the in-use position so that the user can change a child's diaper or proceed other caring process on the changing table at ease.

After the child's diaper has been changed, the changing table can be swung to its storage position (closed position) exterior of the playard. In this regard, the user needs only one hand to press the button 44 inwards, so that the legs 64 urge against the surface 68 of the disc 70 facing the button 44. Due to the urging actions of the legs 64, the teeth 65 and blocks 66 of the disc 70 slip out of the grooves 72, 48, respectively, and are disengaged from the first pivot joint 40. At this instant, the disc 70 continues to urge on the compression spring 60, until its teeth 65 and blocks 66 slip into the grooves 74, 54 of the second pivot joint 50, respectively. The disc 70 is then well received in the cavity of the second pivot joint 50.

At this instant, since the disc 70 has been completely disengaged from the first pivot joint 40, the user can swing the changing table 30 to its storage position conveniently by moving the side rail 36.

Figure 7:
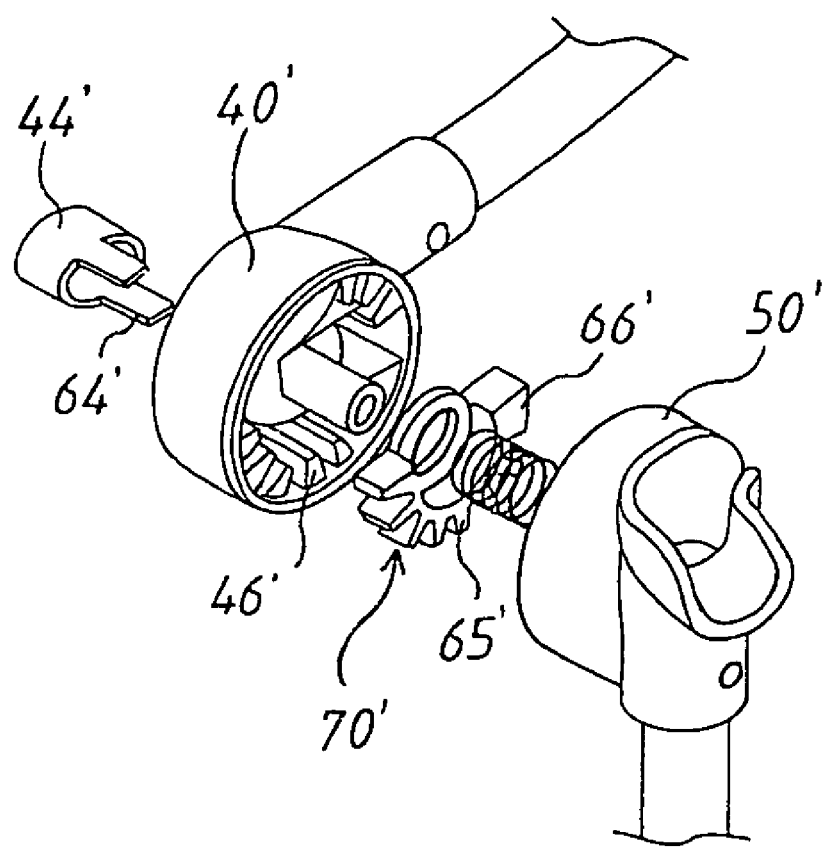
FIG. 7 is an exploded view of an essential component of a changing table according to another preferred embodiment of the present.
Figure 8:
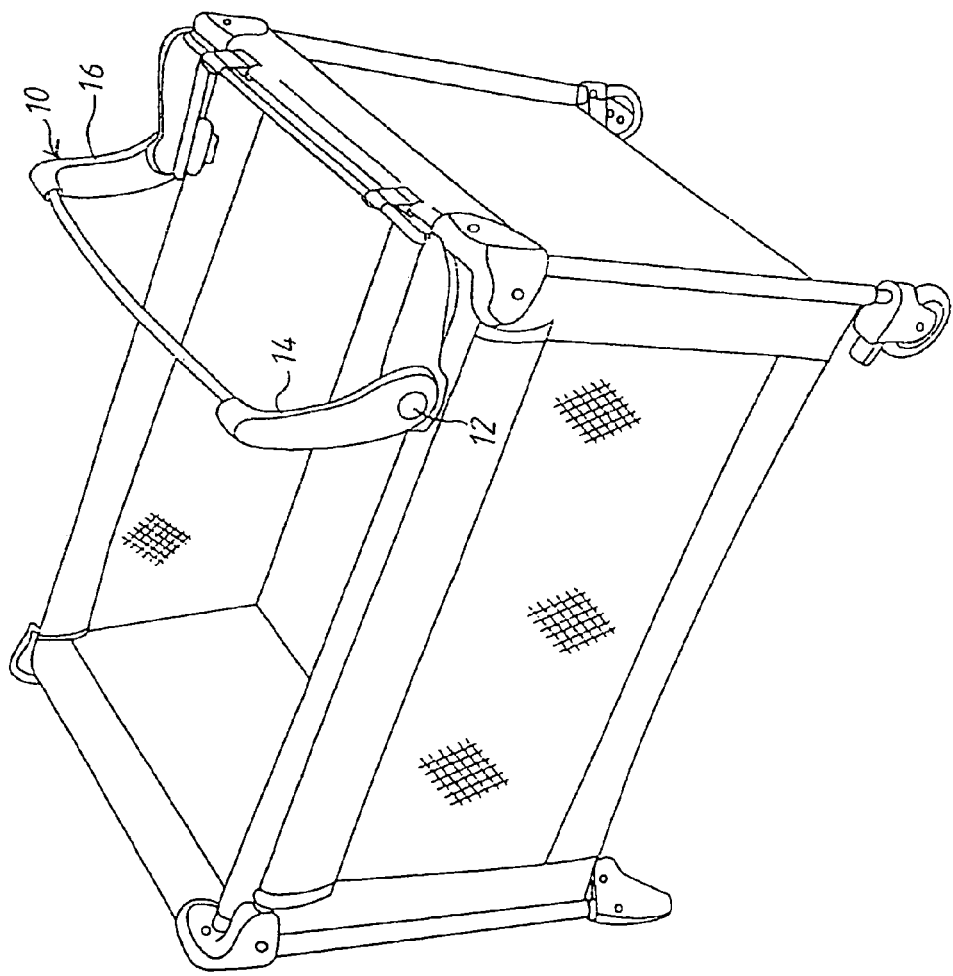
FIG. 8 is a perspective view showing a conventional changing table attached to a conventional playard.

FIG. 7 shows another embodiment of the present invention. In FIG. 7, each of the like numerals is added with a prime (') to indicate like part illustrated in the previous drawings. The embodiment shown in FIG. 7 is different from the preferred embodiment mentioned hereinbefore in that the toothed disc 70' is only half of the toothed disc 70 of the previous embodiment in size. That is to say, the toothed disc 70' is a half-disc. Likewise, the toothed disc 70' includes a plurality of radially extending teeth 65' each having a substantially triangular cross-section, and at an appropriate position, one of the teeth is replaced with a gear-like block 66' substantially rectangular in shape. The first and second pivot joints 40', 50' are substantially similar to the pivot joints 40, 50 of the first embodiment in structure, except that the cavities therein are modified in response to the reduction in dimension of the disc 70'. In particular, ribs 46' corresponding to and designed to cooperate with the teeth 65' and the block 66' are formed only at the lower half of the pivot joints 40', 50'. In addition, button 44' has only two legs 64' with hooks.

Although the foregoing has been described in terms of presently preferred and alternate embodiments, those skilled in the art will recognize that the invention is not limited to the embodiments described. The apparatus of the present invention can be practiced with modification and alteration within the spirit and scope of the appended claims. The description is thus to be regarded as illustrative instead of limiting the present invention.

What is claimed is:

1. A changing table for a playard comprising a first rail, a second rail, and a pair of side rails respectively connected to the first and second rails to form a generally rectangular platform, wherein the changing table has:

a first pivot joint provided at one end of one of said pair of side rails, the first pivot joint is a substantially hollow cylindrical body, and includes at least two spaced ribs formed along an inner periphery thereof to define a groove therebetween;

a second pivot joint provided at one end of the first rail connected to said side rail, the second pivot joint is a substantially hollow cylindrical body, and includes at least two spaced ribs corresponding to the ribs of the first pivot joint formed along an inner periphery thereof to define a groove corresponding to the groove of the first pivot joint, whereby the first and second pivot joints are capable of coupling to each other to define a space therein to receive a disc;

the disc includes at least a radially extending tooth adapted to insert into the groove defined by the ribs of the first and second pivot joints;

actuation means structured to move the disc from a locking position defined by the grooves of the first and second pivot joints to an unlock position in which the at least one tooth of the disc is disengaged from the first pivot joint; and wherein the first pivot joint is movable between an operation position in which the at least one tooth of the disc is engaged with the respective grooves of the first and second pivot joints to lock the first pivot joint, and a storage position in which the at least one tooth of the disc is disengaged from the respective groove of the first pivot joint so that the first pivot joint is unlocked and rotatable.

2. The changing table according to claim 1, further having a compression spring received in the space defined by the first and second pivot joints upon coupling, and which cooperates with the actuation means to push the at least one tooth of the disc into the respective grooves of the first and second pivot joints by means of the spring force thereof in said operation position, and which disengages the at least one tooth of the disc from the groove of the first pivot joint in the storage position.

3. The changing table according to claim 1 or 2, wherein the second rail is integral with the pair of side rails.

4. The changing table according to claim 1 or 2, wherein the changing table is removably attached to the playard.

5. The changing table according to claim 1 or 2, wherein the actuation means is a button.

6. The changing table according to claim 1 or 2, wherein the second pivot joint includes a bar adapted to be attached to the playard so that the changing table can be fixed to the playard.

7. A changing table for a playard comprising a first rail, a second rail, and a pair of side rails respectively connected to the first and second rails to form a generally rectangular platform the changing table having:

a first pivot joint provided at one end of one of said pair of side rails, the first pivot joint is a substantially hollow cylindrical body closed at one end through which a button is inserted, the first pivot joint includes a plurality of spaced ribs formed along an inner periphery thereof, and the plurality of ribs is configured to define a groove each in two adjacent ribs;

a second pivot joint provided at one end of the first rail connected to said side rail, the second pivot joint is a substantially hollow cylindrical body closed at one end, and includes a plurality of ribs corresponding to the ribs of the first pivot joint formed along an inner periphery thereof to define grooves corresponding to the grooves of the first pivot joint, whereby the first and second pivot joints are capable of coupling to each other to define a space therein to receive a toothed disc and a compression spring;

the toothed disc includes a plurality of radially extending teeth adapted to insert into the grooves defined by the ribs of the first and second pivot joints; and wherein the first pivot joint is movable between an operation position and a storage position, wherein in the operation position, the teeth of the disc are engaged with the respective grooves of the first and second pivot joints by the spring force of the compression spring to lock the first pivot joint; and to move the first pivot joint to the storage position, the button is actuated to press the toothed disc to urge on the compression spring so that the toothed disc moves towards the second pivot joint to disengage from the first pivot joint, whereby the first pivot joint is capable of being rotated to reach the storage position.

8. The changing table according to claim 7, wherein each of the ribs of the first and second pivot joints are substantially triangular in cross-section, and the ribs are substantially regularly spaced apart from each other, but in two appropriate positions, at least a rib is omitted so that a wider space is formed in between two adjacent ribs, the plurality of teeth of the toothed disc are spaced apart from each other and each having a substantially triangular cross-section, and at least one of the teeth is replaced with a substantially rectangular gear-shaped block, the teeth and the gear-shaped block of the toothed disc are configured to be inserted into the respective grooves and wider spaces of the first and second pivot joints, respectively, to lock the first pivot joint.

9. The changing table according to claim 7 or 8, wherein the second rail is integral with the pair of side rails.

10. The changing table according to claim 7 or 8, wherein the changing table is removably attached to the playard.

11. The changing table according to claim 7 or 8, wherein the second pivot joint includes a bar adapted to be attached to the playard so that the changing table can be fixed to the playard.

* * * * *